US010972453B1

(12) United States Patent
Natarajan et al.

(10) Patent No.: US 10,972,453 B1
(45) Date of Patent: Apr. 6, 2021

(54) METHODS FOR TOKEN REFRESHMENT BASED ON SINGLE SIGN-ON (SSO) FOR FEDERATED IDENTITY ENVIRONMENTS AND DEVICES THEREOF

(71) Applicant: F5 Networks, Inc., Seattle, WA (US)

(72) Inventors: Ravi Natarajan, Seattle, WA (US); Srinivasa Yarrakonda, Seattle, WA (US)

(73) Assignee: F5 NETWORKS, INC., Seattle, WA (US)

( * ) Notice: Subject to any disclaimer, the term of this patent is extended or adjusted under 35 U.S.C. 154(b) by 346 days.

(21) Appl. No.: 15/857,665

(22) Filed: Dec. 29, 2017

Related U.S. Application Data

(60) Provisional application No. 62/500,699, filed on May 3, 2017.

(51) Int. Cl.
  *H04L 29/06* (2006.01)
  *H04L 9/32* (2006.01)
  *H04L 29/08* (2006.01)

(52) U.S. Cl.
  CPC ........ *H04L 63/0815* (2013.01); *H04L 9/3213* (2013.01); *H04L 63/10* (2013.01); *H04L 63/20* (2013.01); *H04L 67/02* (2013.01)

(58) Field of Classification Search
  CPC ... H04L 63/0815; H04L 9/3213; H04L 63/10; H04L 63/20; H04L 67/02
  See application file for complete search history.

(56) References Cited

U.S. PATENT DOCUMENTS

| | | | |
|---|---|---|---|
| 3,950,735 A | 4/1976 | Patel | |
| 4,644,532 A | 2/1987 | George et al. | |

(Continued)

FOREIGN PATENT DOCUMENTS

| | | |
|---|---|---|
| EP | 0744850 | 11/1996 |
| EP | 01813084 | 8/2007 |

(Continued)

OTHER PUBLICATIONS

F5 Networks Inc., "BIG-IP® Access Policy Manager®: Authentication and Single Sign-On", Manual, May 9, 2016, pp. 1-332, vol. 12.1, F5 Networks, Inc., Retrieved from the Internet<https://support.f5.com/kb/en-us/products/big-ip_apm/manuals/product/apm-authentication-single-sign-on-12-1-0.html>.

(Continued)

*Primary Examiner* — J. Brant Murphy
*Assistant Examiner* — Stephen T Gundry
(74) *Attorney, Agent, or Firm* — Troutman Pepper Hamilton Sanders LLP (Rochester)

(57) ABSTRACT

Methods, non-transitory computer readable media, access policy management apparatuses, and network traffic management systems that send a request received from a client to an application server along with an access token. A determination is made when a received response to the request comprises an unauthorized HyperText Transfer Protocol (HTTP) response status code. The access token is refreshed using a stored refresh token, when the determining indicates that the response is an unauthorized HTTP response status code. The request is resent to the application server along with the refreshed access token. With this technology, an intermediary access policy management apparatus can refresh access tokens automatically and without sending any unauthorized HTTP response status codes received from application servers to client devices, or requiring user re-authorization at the client devices thereby improving the user experience in single sign-on (SSO) federated identity environments.

20 Claims, 4 Drawing Sheets

(56) References Cited

U.S. PATENT DOCUMENTS

| | | |
|---|---|---|
| 4,897,781 A | 1/1990 | Chang et al. |
| 4,965,772 A | 10/1990 | Daniel et al. |
| 5,023,826 A | 6/1991 | Patel |
| 5,053,953 A | 10/1991 | Patel |
| 5,167,024 A | 11/1992 | Smith et al. |
| 5,299,312 A | 3/1994 | Rocco, Jr. |
| 5,327,529 A | 7/1994 | Fults et al. |
| 5,367,635 A | 11/1994 | Bauer et al. |
| 5,371,852 A | 12/1994 | Attanasio et al. |
| 5,388,237 A | 2/1995 | Sodos |
| 5,406,502 A | 4/1995 | Haramaty et al. |
| 5,475,857 A | 12/1995 | Dally |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,663,018 A | 9/1997 | Cummings et al. |
| 5,742,765 A | 4/1998 | Wong et al. |
| 5,752,023 A | 5/1998 | Choucri et al. |
| 5,761,484 A | 6/1998 | Agarwal et al. |
| 5,761,534 A | 6/1998 | Lundberg et al. |
| 5,768,423 A | 6/1998 | Aref et al. |
| 5,774,660 A | 6/1998 | Brendel et al. |
| 5,790,554 A | 8/1998 | Pitcher et al. |
| 5,797,033 A | 8/1998 | Ecclesine |
| 5,802,052 A | 9/1998 | Venkataraman |
| 5,812,550 A | 9/1998 | Sohn et al. |
| 5,825,772 A | 10/1998 | Dobbins et al. |
| 5,828,835 A | 10/1998 | Isfeld et al. |
| 5,832,283 A | 11/1998 | Chou et al. |
| 5,875,296 A | 2/1999 | Shi et al. |
| 5,892,914 A | 4/1999 | Pitts |
| 5,892,932 A | 4/1999 | Kim |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 6,006,260 A | 12/1999 | Barrick, Jr. |
| 6,006,264 A | 12/1999 | Colby et al. |
| 6,026,443 A | 2/2000 | Oskouy et al. |
| 6,026,452 A | 2/2000 | Pitts |
| 6,028,857 A | 2/2000 | Poor |
| 6,051,169 A | 4/2000 | Brown et al. |
| 6,078,956 A | 6/2000 | Bryant et al. |
| 6,085,234 A | 7/2000 | Pitts et al. |
| 6,092,196 A | 7/2000 | Reiche |
| 6,108,703 A | 8/2000 | Leighton et al. |
| 6,111,876 A | 8/2000 | Frantz et al. |
| 6,115,802 A | 9/2000 | Tock et al. |
| 6,128,279 A | 10/2000 | O'Neil et al. |
| 6,128,657 A | 10/2000 | Okanoya et al. |
| 6,160,874 A | 12/2000 | Dickerman et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,233,612 B1 | 5/2001 | Fruchtman et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,263,368 B1 | 7/2001 | Martin |
| 6,289,012 B1 | 9/2001 | Harrington et al. |
| 6,298,380 B1 | 10/2001 | Coile et al. |
| 6,314,408 B1 | 11/2001 | Salas et al. |
| 6,327,622 B1 | 12/2001 | Jindal et al. |
| 6,343,324 B1 | 1/2002 | Hubis et al. |
| 6,347,339 B1 | 2/2002 | Morris et al. |
| 6,360,270 B1 | 3/2002 | Cherkasova et al. |
| 6,374,300 B2 | 4/2002 | Masters |
| 6,396,833 B1 | 5/2002 | Zhang et al. |
| 6,430,562 B1 | 8/2002 | Kardos et al. |
| 6,434,081 B1 | 8/2002 | Johnson et al. |
| 6,480,476 B1 | 11/2002 | Willars |
| 6,484,261 B1 | 11/2002 | Wiegel |
| 6,490,624 B1 | 12/2002 | Sampson et al. |
| 6,510,135 B1 | 1/2003 | Almulhem et al. |
| 6,510,458 B1 | 1/2003 | Berstis et al. |
| 6,519,643 B1 | 2/2003 | Foulkes et al. |
| 6,529,508 B1 | 3/2003 | Li et al. |
| 6,601,084 B1 | 7/2003 | Bhaskaran et al. |
| 6,614,957 B2 | 9/2003 | Wyeth et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,701 B2 | 11/2003 | Hatley |
| 6,661,802 B1 | 12/2003 | Homberg et al. |
| 6,683,873 B1 | 1/2004 | Kwok et al. |
| 6,691,165 B1 | 2/2004 | Bruck et al. |
| 6,694,517 B1 | 2/2004 | James et al. |
| 6,700,871 B1 | 3/2004 | Harper et al. |
| 6,708,187 B1 | 3/2004 | Shanumgam et al. |
| 6,718,380 B1 | 4/2004 | Mohaban et al. |
| 6,742,045 B1 | 5/2004 | Albert et al. |
| 6,748,457 B2 | 6/2004 | Fallon et al. |
| 6,751,663 B1 | 6/2004 | Farrell et al. |
| 6,754,228 B1 | 6/2004 | Ludwig |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,781,990 B1 | 8/2004 | Puri et al. |
| 6,798,777 B1 | 9/2004 | Ferguson et al. |
| 6,804,542 B1 | 10/2004 | Haartsen |
| 6,816,901 B1 | 11/2004 | Sitaraman et al. |
| 6,816,977 B2 | 11/2004 | Brakmo et al. |
| 6,820,133 B1 | 11/2004 | Grove et al. |
| 6,826,698 B1 | 11/2004 | Minkin et al. |
| 6,829,238 B2 | 12/2004 | Tokuyo et al. |
| 6,868,082 B1 | 3/2005 | Allen, Jr. et al. |
| 6,876,629 B2 | 4/2005 | Beshai et al. |
| 6,876,654 B1 | 4/2005 | Hedge |
| 6,888,836 B1 | 5/2005 | Cherkasova |
| 6,904,040 B2 | 6/2005 | Salapura et al. |
| 6,928,082 B2 | 8/2005 | Liu et al. |
| 6,947,985 B2 | 9/2005 | Hegli et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,959,394 B1 | 10/2005 | Brickell et al. |
| 6,975,592 B1 | 12/2005 | Seddigh et al. |
| 6,986,040 B1 | 1/2006 | Kramer et al. |
| 6,987,763 B2 | 1/2006 | Rochberger et al. |
| 6,999,457 B2 | 2/2006 | Shinohara |
| 7,007,092 B2 | 2/2006 | Peiffer |
| 7,058,633 B1 | 6/2006 | Gnagy et al. |
| 7,065,630 B1 | 6/2006 | Ledebohm et al. |
| 7,107,348 B2 | 9/2006 | Shimada et al. |
| 7,113,993 B1 | 9/2006 | Cappiello et al. |
| 7,117,308 B1 | 10/2006 | Mitten et al. |
| 7,133,944 B2 | 11/2006 | Song et al. |
| 7,139,792 B1 | 11/2006 | Mishra et al. |
| 7,142,540 B2 | 11/2006 | Hendel et al. |
| 7,174,393 B2 | 2/2007 | Boucher et al. |
| 7,185,359 B2 | 2/2007 | Schmidt et al. |
| 7,228,422 B2 | 6/2007 | Morioka et al. |
| 7,236,491 B2 | 6/2007 | Tsao et al. |
| 7,272,150 B2 | 9/2007 | Bly et al. |
| 7,281,030 B1 | 10/2007 | Davis |
| 7,283,470 B1 | 10/2007 | Sindhu et al. |
| 7,295,827 B2 | 11/2007 | Liu et al. |
| 7,308,703 B2 | 12/2007 | Wright et al. |
| 7,308,709 B1 | 12/2007 | Brezak et al. |

(56) References Cited

U.S. PATENT DOCUMENTS

| | | |
|---|---|---|
| 7,310,339 B1 | 12/2007 | Powers et al. |
| 7,319,696 B2 | 1/2008 | Inoue et al. |
| 7,321,926 B1 | 1/2008 | Zhang et al. |
| 7,324,525 B2 | 1/2008 | Fuhs et al. |
| 7,333,999 B1 | 2/2008 | Njemanze |
| 7,343,413 B2 | 3/2008 | Gilde et al. |
| 7,349,391 B2 | 3/2008 | Ben-Dor et al. |
| 7,353,326 B2 | 4/2008 | Cho et al. |
| 7,355,977 B1 | 4/2008 | Li |
| 7,376,772 B2 | 5/2008 | Fallon |
| 7,383,570 B2 | 6/2008 | Pinkas et al. |
| 7,398,552 B2 | 7/2008 | Pardee et al. |
| 7,403,542 B1 | 7/2008 | Thompson |
| 7,411,957 B2 | 8/2008 | Stacy et al. |
| 7,415,034 B2 | 8/2008 | Muller et al. |
| 7,420,931 B2 | 9/2008 | Nanda et al. |
| 7,433,962 B2 | 10/2008 | Janssen et al. |
| 7,437,478 B2 | 10/2008 | Yokota et al. |
| 7,454,480 B2 | 11/2008 | Labio et al. |
| 7,457,313 B2 | 11/2008 | Patrick |
| 7,475,122 B2 | 1/2009 | Azpitarte |
| 7,478,186 B1 | 1/2009 | Onufryk et al. |
| 7,490,162 B1 | 2/2009 | Masters |
| 7,496,689 B2 | 2/2009 | Sharp et al. |
| 7,496,695 B2 | 2/2009 | Go et al. |
| 7,500,028 B2 | 3/2009 | Yamagishi |
| 7,500,243 B2 | 3/2009 | Huetsch et al. |
| 7,500,269 B2 | 3/2009 | Huotari et al. |
| 7,505,795 B1 | 3/2009 | Lim et al. |
| 7,512,078 B2 | 3/2009 | Swain |
| 7,512,721 B1 | 3/2009 | Olson |
| 7,516,492 B1 | 4/2009 | Nisbet et al. |
| 7,522,581 B2 | 4/2009 | Acharya et al. |
| 7,526,541 B2 | 4/2009 | Roese et al. |
| 7,533,197 B2 | 5/2009 | Leonard et al. |
| 7,552,232 B2 | 6/2009 | Helmer, Jr. et al. |
| 7,558,197 B1 | 7/2009 | Sindhu et al. |
| 7,558,910 B2 | 7/2009 | Alverson et al. |
| 7,571,180 B2 | 8/2009 | Minyailov |
| 7,571,299 B2 | 8/2009 | Loeb |
| 7,580,971 B1 | 8/2009 | Gollapudi et al. |
| 7,590,732 B2 | 9/2009 | Rune |
| 7,590,753 B2 | 9/2009 | Wolde et al. |
| 7,620,046 B2 | 11/2009 | Ronciak et al. |
| 7,620,071 B2 | 11/2009 | Makineni et al. |
| 7,621,162 B2 | 11/2009 | Bartky |
| 7,624,424 B2 | 11/2009 | Morita et al. |
| 7,644,137 B2 | 1/2010 | Bozak et al. |
| 7,647,416 B2 | 1/2010 | Chiang et al. |
| 7,657,659 B1 | 2/2010 | Lambeth et al. |
| 7,660,916 B2 | 2/2010 | Moskalev et al. |
| 7,668,166 B1 | 2/2010 | Rekhter et al. |
| 7,668,727 B2 | 2/2010 | Mitchell et al. |
| 7,668,851 B2 | 2/2010 | Triplett |
| 7,689,710 B2 | 3/2010 | Tang et al. |
| 7,706,261 B2 | 4/2010 | Sun et al. |
| 7,710,989 B2 | 5/2010 | Chew |
| 7,724,657 B2 | 5/2010 | Rao et al. |
| 7,725,093 B2 | 5/2010 | Sengupta et al. |
| 7,729,239 B1 | 6/2010 | Aronov et al. |
| 7,734,809 B2 | 6/2010 | Joshi et al. |
| 7,735,099 B1 | 6/2010 | Micalizzi, Jr. |
| 7,742,412 B1 | 6/2010 | Medina |
| 7,778,187 B2 | 8/2010 | Chaturvedi et al. |
| 7,784,093 B2 | 8/2010 | Deng et al. |
| 7,808,913 B2 | 10/2010 | Ansari et al. |
| 7,813,277 B2 | 10/2010 | Okholm et al. |
| 7,826,487 B1 | 11/2010 | Mukerji et al. |
| 7,831,662 B2 | 11/2010 | Clark et al. |
| 7,840,841 B2 | 11/2010 | Huang et al. |
| 7,876,677 B2 | 1/2011 | Cheshire |
| 7,877,524 B1 | 1/2011 | Annem et al. |
| 7,908,314 B2 | 3/2011 | Yamaguchi et al. |
| 7,916,728 B1 | 3/2011 | Mimms |
| 7,925,908 B2 | 4/2011 | Kim |
| 7,930,365 B2 | 4/2011 | Dixit et al. |
| 7,933,496 B2 | 4/2011 | Livshits et al. |
| 7,936,772 B2 | 5/2011 | Kashyap |
| 7,945,908 B1 | 5/2011 | Waldspurger et al. |
| 7,984,141 B2 | 7/2011 | Gupta et al. |
| 7,991,918 B2 | 8/2011 | Uha et al. |
| 7,996,569 B2 | 8/2011 | Aloni et al. |
| 8,006,016 B2 | 8/2011 | Muller et al. |
| 8,041,022 B1 | 10/2011 | Andreasen et al. |
| 8,077,620 B2 | 12/2011 | Solomon et al. |
| 8,099,528 B2 | 1/2012 | Millet et al. |
| 8,103,781 B1 | 1/2012 | Wu et al. |
| 8,103,809 B1 | 1/2012 | Michels et al. |
| 8,112,491 B1 | 2/2012 | Michels et al. |
| 8,112,594 B2 | 2/2012 | Giacomoni et al. |
| 8,130,650 B2 | 3/2012 | Allen, Jr. et al. |
| 8,149,819 B2 | 4/2012 | Kobayashi et al. |
| 8,185,475 B2 | 5/2012 | Hug |
| 8,189,567 B2 | 5/2012 | Kavanagh et al. |
| 8,199,757 B2 | 6/2012 | Pani et al. |
| 8,205,246 B2 | 6/2012 | Shatzkamer et al. |
| 8,219,609 B1 | 7/2012 | Bhattacharjee et al. |
| 8,233,380 B2 | 7/2012 | Subramanian et al. |
| 8,239,954 B2 | 8/2012 | Wobber et al. |
| 8,274,895 B2 | 9/2012 | Rahman et al. |
| 8,279,865 B2 | 10/2012 | Giacomoni et al. |
| 8,302,169 B1 | 10/2012 | Presoto et al. |
| 8,306,036 B1 | 11/2012 | Bollay et al. |
| 8,321,908 B2 | 11/2012 | Gai et al. |
| 8,346,993 B2 | 1/2013 | Michels et al. |
| 8,351,333 B2 | 1/2013 | Rao et al. |
| 8,380,854 B2 | 2/2013 | Szabo |
| 8,417,817 B1 | 4/2013 | Jacobs |
| 8,447,871 B1 | 5/2013 | Szabo |
| 8,447,884 B1 | 5/2013 | Baumann |
| 8,447,970 B2 | 5/2013 | Klein et al. |
| 8,448,234 B2 | 5/2013 | Mondaeev et al. |
| 8,452,876 B1 | 5/2013 | Williams et al. |
| 8,464,265 B2 | 6/2013 | Worley |
| 8,468,247 B1 | 6/2013 | Richardson et al. |
| 8,468,267 B2 | 6/2013 | Yigang |
| 8,521,851 B1 | 8/2013 | Richardson et al. |
| 8,521,880 B1 | 8/2013 | Richardson et al. |
| 8,359,224 B2 | 9/2013 | Henderson et al. |
| 8,527,758 B2 | 9/2013 | Mansour |
| 8,566,474 B2 | 10/2013 | Kanode et al. |
| 8,578,050 B2 | 11/2013 | Craig et al. |
| 8,606,921 B2 | 12/2013 | Vasquez et al. |
| 8,615,022 B2 | 12/2013 | Harrison et al. |
| 8,646,067 B2 | 2/2014 | Agarwal et al. |
| 8,665,868 B2 | 3/2014 | Kay |
| 8,701,179 B1 | 4/2014 | Penno et al. |
| 8,725,836 B2 | 5/2014 | Lowery et al. |
| 8,726,338 B2 | 5/2014 | Narayanaswamy et al. |
| 8,737,304 B2 | 5/2014 | Karuturi et al. |
| 8,778,665 B2 | 7/2014 | Glide et al. |
| 8,799,403 B2 | 8/2014 | Chan et al. |
| 8,804,504 B1 | 8/2014 | Chen |
| 8,819,109 B1 | 8/2014 | Krishnamurthy et al. |
| 8,819,419 B2 | 8/2014 | Carlson et al. |
| 8,819,768 B1 | 8/2014 | Koeten et al. |
| 8,830,874 B2 | 9/2014 | Cho et al. |
| 8,848,715 B2 | 9/2014 | Izenberg et al. |
| 8,873,753 B2 | 10/2014 | Parker |
| 8,875,274 B2 | 10/2014 | Montemurro et al. |
| 8,880,632 B1 | 11/2014 | Michels et al. |
| 8,880,696 B1 | 11/2014 | Michels et al. |
| 8,886,981 B1 | 11/2014 | Baumann et al. |
| 8,908,545 B1 | 12/2014 | Chen et al. |
| 8,954,080 B2 | 2/2015 | Janakiraman et al. |
| 8,984,178 B2 | 3/2015 | Michels et al. |
| 9,032,113 B2 | 5/2015 | Conroy et al. |
| 9,036,529 B2 | 5/2015 | Erickson et al. |
| 9,037,166 B2 | 5/2015 | de Wit et al. |
| 9,047,259 B1 | 6/2015 | Ho et al. |
| 9,077,554 B1 | 7/2015 | Szabo |
| 9,083,760 B1 | 7/2015 | Hughes et al. |
| 9,114,326 B2 | 8/2015 | Johnson et al. |
| 9,172,753 B1 | 10/2015 | Jiang et al. |

(56) References Cited

U.S. PATENT DOCUMENTS

| | | |
|---|---|---|
| 9,225,690 B1 * | 12/2015 | Fitch .................... H04L 63/04 |
| 9,246,819 B1 | 1/2016 | Thirasuttakorn |
| 9,505,712 B2 | 11/2016 | Nakashima |
| 9,554,276 B2 | 1/2017 | Thirasuttakorn et al. |
| 9,589,114 B2 | 3/2017 | Strom et al. |
| 9,709,805 B2 | 7/2017 | Weindorf et al. |
| 9,745,800 B2 | 8/2017 | Poteet, III |
| 9,905,829 B2 | 2/2018 | Masuda |
| 9,906,913 B2 | 2/2018 | Ding et al. |
| 9,910,858 B2 | 3/2018 | Fermum et al. |
| 9,939,373 B2 | 4/2018 | Salemo et al. |
| 9,964,967 B2 | 5/2018 | Zheng et al. |
| 10,135,831 B2 | 11/2018 | Zhou et al. |
| 10,243,946 B2 * | 3/2019 | Sridhar .................... H04L 9/30 |
| 10,255,061 B2 * | 4/2019 | Lander .................... G06F 8/656 |
| 10,425,386 B2 * | 9/2019 | Wardell ............... H04L 41/5003 |
| 10,445,395 B2 * | 10/2019 | Carru .................. H04L 67/2852 |
| 2001/0009554 A1 | 7/2001 | Katseff et al. |
| 2001/0023442 A1 | 9/2001 | Masters |
| 2002/0010783 A1 | 1/2002 | Primak et al. |
| 2002/0032777 A1 | 3/2002 | Kawata et al. |
| 2002/0046291 A1 | 4/2002 | O'Callaghan et al. |
| 2002/0049842 A1 | 4/2002 | Huetsch et al. |
| 2002/0059428 A1 | 5/2002 | Susai et al. |
| 2002/0083067 A1 | 6/2002 | Tamayo et al. |
| 2002/0095498 A1 | 7/2002 | Chanda et al. |
| 2002/0112061 A1 | 8/2002 | Shih et al. |
| 2002/0138615 A1 | 9/2002 | Schmelling |
| 2002/0156927 A1 | 10/2002 | Boucher et al. |
| 2002/0161913 A1 | 10/2002 | Gonzalez et al. |
| 2002/0194342 A1 | 12/2002 | Lu et al. |
| 2002/0198993 A1 | 12/2002 | Cudd et al. |
| 2003/0005118 A1 * | 1/2003 | Williams ................. H04L 63/08 709/225 |
| 2003/0037070 A1 | 2/2003 | Marston |
| 2003/0046291 A1 | 3/2003 | Fascenda |
| 2003/0065653 A1 | 4/2003 | Overton et al. |
| 2003/0065951 A1 | 4/2003 | Igeta et al. |
| 2003/0067930 A1 | 4/2003 | Salapura et al. |
| 2003/0069918 A1 | 4/2003 | Lu et al. |
| 2003/0069974 A1 | 4/2003 | Lu et al. |
| 2003/0070069 A1 | 4/2003 | Belapurkar et al. |
| 2003/0086415 A1 | 5/2003 | Bernhard et al. |
| 2003/0105807 A1 | 6/2003 | Thompson et al. |
| 2003/0105983 A1 | 6/2003 | Brakmo et al. |
| 2003/0108052 A1 | 6/2003 | Inoue et al. |
| 2003/0120948 A1 | 6/2003 | Schmidt et al. |
| 2003/0128708 A1 | 7/2003 | Inoue et al. |
| 2003/0145062 A1 | 7/2003 | Sharma et al. |
| 2003/0145233 A1 | 7/2003 | Poletto et al. |
| 2003/0163576 A1 | 8/2003 | Janssen et al. |
| 2003/0188193 A1 | 10/2003 | Vishwanath |
| 2003/0204636 A1 | 10/2003 | Greenblat et al. |
| 2003/0208596 A1 | 11/2003 | Carolan et al. |
| 2003/0225485 A1 | 12/2003 | Fritz et al. |
| 2004/0003287 A1 | 1/2004 | Zissimopoulos et al. |
| 2004/0006590 A1 | 1/2004 | Lucovsky et al. |
| 2004/0072569 A1 | 4/2004 | Omae et al. |
| 2004/0103283 A1 | 5/2004 | Hornak |
| 2004/0111523 A1 | 6/2004 | Hall et al. |
| 2004/0111621 A1 | 6/2004 | Himberger et al. |
| 2004/0117493 A1 | 6/2004 | Bazot et al. |
| 2004/0151186 A1 | 8/2004 | Akama |
| 2004/0192312 A1 | 9/2004 | Li et al. |
| 2004/0199762 A1 | 10/2004 | Carlson et al. |
| 2004/0202161 A1 | 10/2004 | Stachura et al. |
| 2004/0210663 A1 | 10/2004 | Phillips et al. |
| 2004/0243808 A1 * | 12/2004 | Ishiguro ................. G06F 21/10 713/176 |
| 2004/0249881 A1 | 12/2004 | Uha et al. |
| 2004/0249948 A1 | 12/2004 | Sethi et al. |
| 2004/0255000 A1 | 12/2004 | Simionescu et al. |
| 2004/0264472 A1 | 12/2004 | Oliver et al. |
| 2004/0264481 A1 | 12/2004 | Darling et al. |
| 2004/0267897 A1 | 12/2004 | Hill et al. |
| 2004/0267920 A1 | 12/2004 | Hydrie et al. |
| 2004/0267948 A1 | 12/2004 | Oliver et al. |
| 2004/0268358 A1 | 12/2004 | Darling et al. |
| 2005/0004887 A1 | 1/2005 | Igakura et al. |
| 2005/0005133 A1 | 1/2005 | Xia et al. |
| 2005/0007991 A1 | 1/2005 | Ton et al. |
| 2005/0021736 A1 | 1/2005 | Carusi et al. |
| 2005/0027869 A1 | 2/2005 | Johnson |
| 2005/0044213 A1 | 2/2005 | Kobayashi et al. |
| 2005/0052440 A1 | 3/2005 | Kim et al. |
| 2005/0055435 A1 | 3/2005 | Gbadegesin et al. |
| 2005/0071283 A1 | 3/2005 | Randle et al. |
| 2005/0078604 A1 | 4/2005 | Yim |
| 2005/0083952 A1 | 4/2005 | Swain |
| 2005/0114559 A1 | 5/2005 | Miller |
| 2005/0122942 A1 | 6/2005 | Rhee et al. |
| 2005/0122977 A1 | 6/2005 | Lieberman |
| 2005/0154837 A1 | 7/2005 | Keohane et al. |
| 2005/0175014 A1 | 8/2005 | Patrick |
| 2005/0187866 A1 | 8/2005 | Lee |
| 2005/0188220 A1 | 8/2005 | Nilsson et al. |
| 2005/0198310 A1 | 9/2005 | Kim et al. |
| 2005/0213570 A1 | 9/2005 | Stacy et al. |
| 2005/0262238 A1 | 11/2005 | Reeves et al. |
| 2005/0288939 A1 | 12/2005 | Peled et al. |
| 2006/0007928 A1 | 1/2006 | Sangillo |
| 2006/0031520 A1 | 2/2006 | Bedekar et al. |
| 2006/0036764 A1 | 2/2006 | Yokota et al. |
| 2006/0059267 A1 | 3/2006 | Cugi et al. |
| 2006/0067349 A1 | 3/2006 | Ronciak et al. |
| 2006/0077902 A1 | 4/2006 | Kannan et al. |
| 2006/0077986 A1 | 4/2006 | Rune |
| 2006/0083205 A1 | 4/2006 | Buddhikot et al. |
| 2006/0095573 A1 | 5/2006 | Carle et al. |
| 2006/0104303 A1 | 5/2006 | Makineni et al. |
| 2006/0106802 A1 | 5/2006 | Giblin et al. |
| 2006/0112176 A1 | 5/2006 | Liu et al. |
| 2006/0112272 A1 | 5/2006 | Morioka et al. |
| 2006/0129684 A1 | 6/2006 | Datta |
| 2006/0135198 A1 | 6/2006 | Lee |
| 2006/0156416 A1 | 7/2006 | Huotari et al. |
| 2006/0161577 A1 | 7/2006 | Kulkrni et al. |
| 2006/0168070 A1 | 7/2006 | Thompson et al. |
| 2006/0171365 A1 | 8/2006 | Borella |
| 2006/0179153 A1 | 8/2006 | Lee et al. |
| 2006/0182103 A1 | 8/2006 | Martini et al. |
| 2006/0184647 A1 | 8/2006 | Dixit et al. |
| 2006/0209853 A1 | 9/2006 | Hidaka et al. |
| 2006/0221832 A1 | 10/2006 | Muller et al. |
| 2006/0221835 A1 | 10/2006 | Sweeney |
| 2006/0230148 A1 | 10/2006 | Forecast et al. |
| 2006/0233106 A1 | 10/2006 | Achlioptas et al. |
| 2006/0235996 A1 | 10/2006 | Wolde et al. |
| 2006/0242300 A1 | 10/2006 | Yumoto et al. |
| 2006/0253583 A1 | 11/2006 | Dixon |
| 2006/0268704 A1 | 11/2006 | Ansari et al. |
| 2006/0288128 A1 | 12/2006 | Moskalev et al. |
| 2006/0291483 A1 | 12/2006 | Sela |
| 2006/0294054 A1 | 12/2006 | Kudo et al. |
| 2007/0006293 A1 | 1/2007 | Balakrishnan et al. |
| 2007/0016662 A1 | 1/2007 | Desai et al. |
| 2007/0019658 A1 | 1/2007 | Park et al. |
| 2007/0050843 A1 | 3/2007 | Manville et al. |
| 2007/0058670 A1 | 3/2007 | Konduru et al. |
| 2007/0064661 A1 | 3/2007 | Sood et al. |
| 2007/0083646 A1 | 4/2007 | Miller et al. |
| 2007/0087756 A1 | 4/2007 | Hoffberg |
| 2007/0088822 A1 | 4/2007 | Coile et al. |
| 2007/0106796 A1 | 5/2007 | Kudo et al. |
| 2007/0107048 A1 | 5/2007 | Halls et al. |
| 2007/0118879 A1 | 5/2007 | Yeun |
| 2007/0174491 A1 | 7/2007 | Still et al. |
| 2007/0219917 A1 | 9/2007 | Liu et al. |
| 2007/0220598 A1 | 9/2007 | Salowey et al. |
| 2007/0233809 A1 | 10/2007 | Brownell et al. |
| 2007/0258451 A1 | 11/2007 | Bouat |
| 2007/0297410 A1 | 12/2007 | Yoon et al. |
| 2007/0297551 A1 | 12/2007 | Choi |
| 2008/0008202 A1 | 1/2008 | Terrell et al. |

(56) References Cited

U.S. PATENT DOCUMENTS

| | | |
|---|---|---|
| 2008/0010207 A1 | 1/2008 | Yanagihara et al. |
| 2008/0025297 A1 | 1/2008 | Kashyap |
| 2008/0031258 A1 | 2/2008 | Acharya et al. |
| 2008/0034136 A1 | 2/2008 | Ulenas |
| 2008/0059797 A1 | 3/2008 | Tokuno et al. |
| 2008/0072303 A1 | 3/2008 | Syed |
| 2008/0101596 A1 | 5/2008 | Cerruti et al. |
| 2008/0120370 A1 | 5/2008 | Chan et al. |
| 2008/0126509 A1 | 5/2008 | Subramanian et al. |
| 2008/0133518 A1 | 6/2008 | Kapoor et al. |
| 2008/0134311 A1 | 6/2008 | Medvinsky et al. |
| 2008/0148340 A1 | 6/2008 | Powell et al. |
| 2008/0159145 A1 | 7/2008 | Muthukrishnan et al. |
| 2008/0165801 A1 | 7/2008 | Sheppard |
| 2008/0177994 A1 | 7/2008 | Mayer |
| 2008/0178278 A1 | 7/2008 | Grinstein et al. |
| 2008/0184248 A1 | 7/2008 | Barua et al. |
| 2008/0201599 A1 | 8/2008 | Ferraiolo et al. |
| 2008/0205613 A1 | 8/2008 | Lopez |
| 2008/0219279 A1 | 9/2008 | Chew |
| 2008/0222646 A1 | 9/2008 | Sigal et al. |
| 2008/0225710 A1 | 9/2008 | Raja et al. |
| 2008/0229415 A1 | 9/2008 | Kapoor et al. |
| 2008/0235508 A1 | 9/2008 | Ran et al. |
| 2008/0239986 A1 | 10/2008 | Xu et al. |
| 2008/0253395 A1 | 10/2008 | Pandya |
| 2008/0256224 A1 | 10/2008 | Kaji et al. |
| 2008/0279200 A1 | 11/2008 | Shatzkamer et al. |
| 2008/0282354 A1 | 11/2008 | Wobber et al. |
| 2008/0288661 A1 | 11/2008 | Galles |
| 2008/0301760 A1 | 12/2008 | Lim |
| 2008/0316922 A1 | 12/2008 | Riddle et al. |
| 2009/0003204 A1 | 1/2009 | Okholm et al. |
| 2009/0016217 A1 | 1/2009 | Kashyap |
| 2009/0028337 A1 | 1/2009 | Balabine et al. |
| 2009/0049230 A1 | 2/2009 | Pandya |
| 2009/0070617 A1 | 3/2009 | Arimilli et al. |
| 2009/0077619 A1 | 3/2009 | Boyce |
| 2009/0089619 A1 | 4/2009 | Huang et al. |
| 2009/0094610 A1 | 4/2009 | Sukirya |
| 2009/0119504 A1 | 5/2009 | van Os et al. |
| 2009/0125496 A1 | 5/2009 | Wexler et al. |
| 2009/0125532 A1 | 5/2009 | Wexler et al. |
| 2009/0125625 A1 | 5/2009 | Shim et al. |
| 2009/0138749 A1 | 5/2009 | Moll et al. |
| 2009/0141891 A1 | 6/2009 | Boyen et al. |
| 2009/0157678 A1 | 6/2009 | Turk |
| 2009/0193126 A1 | 7/2009 | Agarwal et al. |
| 2009/0193513 A1 | 7/2009 | Agarwal et al. |
| 2009/0196282 A1 | 8/2009 | Fellman et al. |
| 2009/0222598 A1 | 9/2009 | Hayden |
| 2009/0228956 A1 | 9/2009 | He et al. |
| 2009/0248893 A1 | 10/2009 | Richardson et al. |
| 2009/0248911 A1 | 10/2009 | Conroy et al. |
| 2009/0287935 A1 | 11/2009 | Aull et al. |
| 2009/0296624 A1 | 12/2009 | Ryu et al. |
| 2009/0300407 A1 | 12/2009 | Kamath et al. |
| 2010/0011434 A1 | 1/2010 | Kay |
| 2010/0017627 A1 | 1/2010 | Princen et al. |
| 2010/0017846 A1 | 1/2010 | Huang et al. |
| 2010/0071048 A1 | 3/2010 | Novak et al. |
| 2010/0082849 A1 | 4/2010 | Millet et al. |
| 2010/0094945 A1 | 4/2010 | Chan et al. |
| 2010/0115236 A1 | 5/2010 | Bataineh et al. |
| 2010/0122091 A1 | 5/2010 | Huang et al. |
| 2010/0150154 A1 | 6/2010 | Viger et al. |
| 2010/0150169 A1 | 6/2010 | Brown et al. |
| 2010/0154031 A1 | 6/2010 | Montemurro et al. |
| 2010/0165877 A1 | 7/2010 | Shukla et al. |
| 2010/0188976 A1 | 7/2010 | Rahman et al. |
| 2010/0189052 A1 | 7/2010 | Kavanagh |
| 2010/0191974 A1* | 7/2010 | Dubhashi ............... H04L 9/3247 713/176 |
| 2010/0242092 A1 | 9/2010 | Harris et al. |
| 2010/0251330 A1 | 9/2010 | Kroeselberg et al. |
| 2010/0279733 A1 | 11/2010 | Karsten et al. |
| 2010/0299451 A1 | 11/2010 | Yigang et al. |
| 2010/0322250 A1 | 12/2010 | Shetty et al. |
| 2010/0325277 A1 | 12/2010 | Muthiah et al. |
| 2011/0040889 A1 | 2/2011 | Garrett et al. |
| 2011/0047620 A1 | 2/2011 | Mahaffey et al. |
| 2011/0087888 A1 | 4/2011 | Rennie |
| 2011/0090541 A1 | 4/2011 | Harper |
| 2011/0107077 A1 | 5/2011 | Henderson et al. |
| 2011/0153822 A1 | 6/2011 | Rajan et al. |
| 2011/0154443 A1 | 6/2011 | Thakur et al. |
| 2011/0173295 A1 | 7/2011 | Bakke et al. |
| 2011/0184733 A1 | 7/2011 | Yu et al. |
| 2011/0197059 A1 | 8/2011 | Klein et al. |
| 2011/0202676 A1 | 8/2011 | Craig et al. |
| 2011/0246800 A1 | 10/2011 | Accpadi et al. |
| 2011/0273984 A1 | 11/2011 | Hsu et al. |
| 2011/0277016 A1 | 11/2011 | Hockings et al. |
| 2011/0282997 A1 | 11/2011 | Prince et al. |
| 2011/0314178 A1 | 12/2011 | Kanode et al. |
| 2011/0321122 A1 | 12/2011 | Mwangi et al. |
| 2012/0016994 A1 | 1/2012 | Nakamura et al. |
| 2012/0030341 A1 | 2/2012 | Jensen et al. |
| 2012/0039341 A1 | 2/2012 | Latif et al. |
| 2012/0041965 A1 | 2/2012 | Vasquez et al. |
| 2012/0063314 A1 | 3/2012 | Pignataro et al. |
| 2012/0066489 A1 | 3/2012 | Ozaki et al. |
| 2012/0079055 A1 | 3/2012 | Robinson |
| 2012/0101952 A1 | 4/2012 | Raleigh et al. |
| 2012/0124372 A1 | 5/2012 | Dilley et al. |
| 2012/0191800 A1 | 7/2012 | Michels et al. |
| 2012/0191847 A1 | 7/2012 | Nas et al. |
| 2012/0198043 A1 | 8/2012 | Hesketh et al. |
| 2012/0224531 A1 | 9/2012 | Karuturi et al. |
| 2012/0311153 A1 | 12/2012 | Morgan |
| 2012/0317266 A1 | 12/2012 | Abbott |
| 2013/0029726 A1 | 1/2013 | Berionne et al. |
| 2013/0031060 A1 | 1/2013 | Lowery et al. |
| 2013/0054433 A1 | 2/2013 | Giard |
| 2013/0055367 A1 | 2/2013 | Kshirsagar |
| 2013/0067546 A1 | 3/2013 | Thavasi |
| 2013/0091002 A1 | 4/2013 | Christie et al. |
| 2013/0163758 A1 | 6/2013 | Swaminathan et al. |
| 2013/0198322 A1 | 8/2013 | Oran et al. |
| 2013/0205361 A1 | 8/2013 | Narayanaswamy et al. |
| 2013/0262873 A1 | 10/2013 | Read |
| 2013/0282589 A1 | 10/2013 | Shoup |
| 2013/0336122 A1 | 12/2013 | Baruah et al. |
| 2014/0032695 A1 | 1/2014 | Michels et al. |
| 2014/0040478 A1 | 2/2014 | Hsu et al. |
| 2014/0059678 A1 | 2/2014 | Parker |
| 2014/0095661 A1 | 4/2014 | Knowles et al. |
| 2014/0162705 A1 | 6/2014 | de Wit et al. |
| 2014/0171089 A1 | 6/2014 | Janakiraman et al. |
| 2014/0185422 A1 | 7/2014 | Kobayashi et al. |
| 2014/0250535 A1* | 9/2014 | Qu ............... G06F 21/10 726/26 |
| 2014/0269484 A1 | 9/2014 | Dankberg et al. |
| 2014/0301207 A1 | 10/2014 | Durand et al. |
| 2014/0317404 A1 | 10/2014 | Carlson et al. |
| 2015/0089569 A1* | 3/2015 | Sondhi ............... H04L 63/0807 726/1 |
| 2015/0319174 A1* | 11/2015 | Hayton ............... H04L 63/0884 726/7 |
| 2016/0028737 A1* | 1/2016 | Srinivasan ............... H04L 63/0807 726/1 |
| 2016/0080361 A1* | 3/2016 | Sondhi ............... H04L 63/205 726/8 |
| 2016/0234170 A1* | 8/2016 | Bone ............... H04W 4/12 |
| 2016/0291940 A1* | 10/2016 | Searle ............... H04L 41/082 |
| 2016/0291959 A1* | 10/2016 | Searle ............... H04L 63/10 |
| 2016/0294605 A1* | 10/2016 | Searle ............... H04L 41/082 |
| 2016/0294614 A1* | 10/2016 | Searle ............... H04L 67/34 |
| 2016/0366120 A1* | 12/2016 | Rykowski ............... H04L 63/0815 |
| 2017/0099280 A1* | 4/2017 | Goel ............... H04L 63/168 |
| 2017/0126661 A1* | 5/2017 | Brannon ............... H04L 63/0823 |
| 2017/0187521 A1* | 6/2017 | Fitch ............... H04L 67/02 |
| 2017/0331791 A1* | 11/2017 | Wardell ............... H04L 67/2814 |
| 2017/0331802 A1* | 11/2017 | Keshava ............... H04L 9/0891 |

(56) References Cited

U.S. PATENT DOCUMENTS

| | | | |
|---|---|---|---|
| 2017/0331829 A1* | 11/2017 | Lander | H04L 67/02 |
| 2017/0331832 A1* | 11/2017 | Lander | H04L 63/0807 |
| 2018/0007059 A1* | 1/2018 | Innes | H04L 63/107 |
| 2018/0013763 A1* | 1/2018 | Wilson | H04L 63/0884 |
| 2018/0039494 A1* | 2/2018 | Lander | H04L 63/0815 |
| 2018/0041467 A1* | 2/2018 | Vats | H04L 9/3213 |
| 2018/0041491 A1* | 2/2018 | Gupta | G06F 9/50 |
| 2018/0041515 A1* | 2/2018 | Gupta | G06F 21/53 |
| 2018/0075231 A1* | 3/2018 | Subramanian | H04L 63/0815 |
| 2018/0077138 A1* | 3/2018 | Bansal | G06F 9/5027 |
| 2018/0077144 A1* | 3/2018 | Gangawane | H04L 63/102 |
| 2018/0081983 A1* | 3/2018 | Carru | H04L 67/20 |
| 2018/0083915 A1* | 3/2018 | Medam | H04L 61/1523 |
| 2018/0083944 A1* | 3/2018 | Vats | H04L 63/0815 |
| 2018/0097802 A1* | 4/2018 | Lander | H04L 63/104 |
| 2018/0109506 A1* | 4/2018 | Helsen | H04L 67/02 |
| 2018/0131685 A1* | 5/2018 | Sridhar | H04L 9/3247 |
| 2018/0145968 A1* | 5/2018 | Rykowski | G06F 21/41 |
| 2018/0255030 A1* | 9/2018 | Gupta | H04L 63/0428 |
| 2019/0149592 A1* | 5/2019 | Lander | H04L 67/22 726/4 |
| 2019/0155597 A1* | 5/2019 | Lander | G06F 8/656 |
| 2019/0222568 A1* | 7/2019 | Sridhar | H04L 9/14 |
| 2019/0364020 A1* | 11/2019 | Wardell | H04W 12/0609 |
| 2019/0392017 A1* | 12/2019 | Carru | G06F 16/9574 |

FOREIGN PATENT DOCUMENTS

| | | |
|---|---|---|
| WO | WO 00/04422 | 1/2000 |
| WO | WO 00/04458 | 1/2000 |
| WO | WO 2004/079930 | 9/2004 |
| WO | WO 2006/055494 | 5/2006 |
| WO | WO 2007/040858 | 4/2007 |
| WO | WO 2009/158680 | 12/2009 |

OTHER PUBLICATIONS

F5 Networks Inc., "BIG-IP® Access Policy Manager®: Application Access", Manual, May 9, 2016, pp. 1-66, vol. 12.1, F5 Networks, Inc., Retrieved from the Internet<https://support.f5.com/kb/en-us/products/big-ip_apm/manuals/product/apm-application-access-12-1-0.html>.

F5 Networks Inc., "BIG-IP® Local Traffic Management: Basics", Manual, May 9, 2016, pp. 1-58, vol. 12.1, F5 Networks, Inc., Retrieved from the Internet<https://support.f5.com/kb/en-us/products/big-ip_ltm/manuals/product/ltm-basics-12-1-0.html>.

F5 Networks Inc., "BIG-IP® Access Policy Manager®: Implementations", Manual, May 9, 2016, pp. 1-168, vol. 12.1, F5 Networks, Inc., Retrieved from the Internet<https://support.f5.com/kb/en-us/products/big-ip_apm/manuals/product/apm-implementations-12-1-0.html>.

"A Process for Selective Routing of Servlet Content to Transcoding Modules," Research Disclosure 422124, pp. 889-890, Disclosed by IBM Corporation, Jun. 1999.

Corbet et al., "Memory Mapping and DMA," Chapter 15, from Linux Device Drivers, 3rd Edition, 13676, pp. 412-463, Jan. 21, 2005.

"Plan 9 kernel history: overview/file list/diff list," http://swtch.com/cgi-bin/plan9history.cgi?f=2001/0126/pc/etherga620.com, pp. 1-16, accessed Oct. 22, 2007.

"Servlet/Applet/Html Authentication Process With Single Sign-On," Research Disclosure 429128, pp. 163-164, Disclosed by IBM Corporation, Jan. 2000.

"Traffic Surges: Attack or Legitimate," PowerPoint Presentation, slides 1-12, Citrix Systems, Inc., 2005.

Abad et al., "An Analysis on the Schemes for Detecting and Preventing Arp Cache Poisoning Attacks," 27th International Conference on Distributed Computing Systems Workshops (ICDCSW'07), 8 pp, Added to IEEE Xplore Jul. 30, 2007.

"Gigabit Ethernet/PCI Network Interface Card; Host/NIC Software Interface Definition," Alteon Websystems Inc., Revision 12.4.13, P/N 020001, pp. 1-80, Jul. 1999.

"Layer 4/7 Switching and Other Custom IP Traffic Processing Using the NEPPI API," Bell Laboratories, Lucent Technologies, pp. 1-11, 1999.

"Cavium Networks Product Selector Guide — Single & Multi-Core MIPS Processors, Security Processors and Accelerator Boards," Cavium Networks, 44 pp, Revision 3, Spring 2008.

"NITROX™ XL Security Acceleration Modules PCI 3V or 3V/5V-Universal Boards for SSL and IPSec," Cavium Networks, at http://www.Caviumnetworks.com, 1 pp, 2002.

"PCI, PCI-X," Cavium Networks, at http://www.cavium.com/acceleration_boards_PCI_PCI-X.htm, 1 pp, last accessed Oct. 24, 2008.

Hong et al, "Two-Factor Face Authentication: Topographic Independent Component Analysis (TICA) and Multispace Random Projection (MRP)", 2009 International Conference of Soft Computing and Pattern Recognition, pp. 756-761, Dec. 4-7, 2009.

"Comtech AHA Announces 3.0 Gbps GZIP Compression/Decompression Accelerator AHA362-PCIX Offers High-Speed GZIP Compression and Decompression," Comtech AHA Corporation, News Release, 2 pp, Apr. 20, 2005.

"Comtech AHA Announces GZIP Compression/Decompression IC offers the highest-speed and aompression ration performance in hardware on the market," Comtech AHA Corporation, New Release, 2 pp, Jun. 26, 2007.

"Application Layer Processing (ALP)," Crescendo Networks, pp. 168-186, Chapter 9, CN-5000E/5500E, Foxit Software company, 2003.

"DMA and Interrupt Handling," EVENTHELIX, http://eventhelix.com/RealtimeMantra/FaultHandling/dma_interrupt_handling_htm, pp. 1-4, Last accessed Jan. 29, 2010.

"TCP-Transmission Control Protocol (TCP Fast Retransmit and Recovery)," Eventhelix, EventHelix.com, pp. 1-5, Mar. 28, 2002.

"BIG-IP® Access Policy Manager® Application Access Guide," Version 11.0, F5 Networks, Inc., Publication Number MAN-0360-00, pp. 1-24, Aug. 17, 2011.

"BIG-IP® Access Policy Manager® Network Access Configuration Guide," Version 11.1, F5 Networks, Inc., pp. 1-38, Publication Number MAN-0362-01, pp. 1-58, Nov. 15, 2011.

"Big-IP® Access Policy Manager® Portal Access Guide," Version 11.1, F5 Networks, Inc., Publication Number MAN-0364-01, pp. 1-38, Nov. 15, 2011.

"BIG-IP® Access Policy Manager® Single Sign-On Configuration Guide," Version 11.1, F5 Networks, Inc., Publication Number MAN-0363-01, pp. 1-38, Nov. 15, 2011.

"BIG-IP® Access Policy Manager® Authentication Configuration Guide," Version 11.1, F5 Networks, Inc., Publication Number MAN-0359-01, pp. 1-68, Nov. 15, 2011.

"Configuration Guide for BIG-IP® Access Policy Manager®," Version 11.1, F5 Networks, Inc., Publication No. MAN-0309-03, pp. 1-436, Oct. 14, 2013.

"Configuration Guide for Local Traffic Management," Version 9.2.2, F5 Networks, Inc., Publication Number MAN-0182-01, 406 pp, Jan. 12, 2006.

"BIG-IP Controller with Exclusive OneConnect Content Switching Feature Provides a Breakthrough System for Maximizing Server and Network Performance," Press Release, F5 Networks, Inc., 2 pp, May 8, 2001.

"SOL11199: Creating a High Availability LDAP Authentication Configuration," F5 Networks, Inc., retrieved from http://support.f5.com/kb/en-us/solutions/public/11000/100/sol11199.print.html, 3 pp, Jun. 13, 2012.

Fielding et al., "Hypertext Transfer Protocol — HTTP/1.1," Network Working Group, Request for Comments 2068, category: Standards Track, pp. 1-162, Jan. 1997.

Fielding et al., "Hypertext Transfer Protocol — HTTP/1.1," Network Working Group, Request for Comments 2616, Obsoletes 2068, Category: Standard Tracks, pp. 1-176, Jun. 1999.

Floyd et al., "Random Early Detection Gateways for Congestion Avoidance," IEEE/ACM Transactions on Networking, pp. 1-22, Aug. 1993.

(56) References Cited

OTHER PUBLICATIONS

Harvey et al., "DMA Fundamentals on Various PC Platforms," National Instruments Corporation, Application Note 011, pp. 1-20, Apr. 1991.

Hazelwood et al., "Improved Grid Security Posture through Multi-factor Authentication", 2011 IEEE/ACM 12th International Conference on Grid Computing, 8 pp, Nov. 15, 2011.

Hochmuth, Phil, "F5, CacheFlow Pump Up Content-Delivery Lines," Network World Fusion, 1 pp., May 4, 2001.

International Search Report and Written Opinion for International Application No. PCT/US2011/058469, filed Oct. 28, 2011, 9 pages, dated May 30, 2012.

International Search Report and Written Opinion for International Application No. PCT/US2012/022996, filed Jan. 27, 2012, 12 pages, dated May 30, 2012.

International Search Report and Written Opinion for International Application No. PCT/US2013/026615, filed Feb. 19, 2013, 10 pp, dated Jul. 4, 2013.

Macvittie, Lori, "Message-Based Load Balancing," Technical Brief, pp. 1-9, F5 Networks, Inc., 2010.

Mangino, John, "Using DMA with High Performance Peripherals to Maximize System Performance," WW TMS470 catalog Applications, 23 pp, SPNA105, Jan. 2007.

Mogul, Jeffrey C., "The Case for Persistent-Connection HTTP," ACM SIGCOMM Computer Communication Review, vol. 25, No. 4, pp. 299-313, Oct. 1995.

Mohammed et al., "A Multi-Layer of Multi Factors Authentication Model for Online Banking Services," 2013 International Conference on Computing, Electrical and Electronics Engineering (ICCEEE), pp. 220-224, Oct. 17, 2013.

"Testing for Cross Site Scripting", Owasp Testing Guide v2, Table of Contents, pp. 1-5, Jul. 27, 2011.

Rabinovich et al., "DHTTP: An Efficient and Cache-Friendly Transfer Protocol for the Web," IEEE/ACM Transactions on Networking, vol. 12, No. 6, pp. 1007-1020, Dec. 2004.

Salchow, Jr., KJ, "Clustered Multiprocessing: Changing the Rules of the Performance Game," F5 White Paper, F5 Networks, Inc., pp. 1-11, 2008.

Stevens, W., "TCP Slow Start, Congestion Avoidance, Fast Retransmit, and Fast Recovery Algorithms," Network Norking Group, Request for Comments 2001, Category Standards Track, pp. 1-6, Jan. 1997.

Traore et al., "Combining Mouse and Keystroke Dynamics Biometrics for Risk-Based Authentication in Web Environments", 2012 Fourth International Conference on Digital Home, pp. 138-145, Dec. 11, 2012.

Wadge, Wallace, "Achieving Gigabit Performance on Programmable Ethernet Network Interface Cards," pp. 1-9, May 29, 2001.

Welch, Von, "A User's Guide to TCP Windows," Jun. 19, 1996.

Wikipedia, "Direct Memory Access," http://en.wikipedia.org/wiki/Direct_memory_access, 6 pp., Jan. 26, 2010.

Wikipedia, "Nagle's algorithm," http://en.wikipedia.org/wiki/Nagle%27s_algorithm>, 2 pp., Oct. 9, 2009.

"Principal Names and DNS," MIT Kerberos Documentation, Kerberos Consortium, XP-002699094, pp. 1-3, Jan. 1, 1999.

Thu et al., "Generating KDC Referrals to Locate Kerberos Realms draft-ieff-krb-wg-kerberos-referrals-05," Microsoft Corporation, Obsoletes 2478 (if approved), Expires Apr. 25, 2005, 18 pp., Oct. 25, 2004.

\* cited by examiner

METHODS FOR TOKEN REFRESHMENT BASED ON SINGLE SIGN-ON (SSO) FOR FEDERATED IDENTITY ENVIRONMENTS AND DEVICES THEREOF

This application claims the benefit of U.S. Provisional Patent Application Ser. No. 62/500,699 filed May 3, 2017, which is hereby incorporated by reference in its entirety.

FIELD

This technology generally relates to authentication and, more particularly, to token refreshment based on single sign-on (SSO) for federated identity environments.

BACKGROUND

Federated identity environments facilitate the secure exchange of identity information across Internet domains. In such an environment, users of client devices are authenticated by an identity provider device, also referred to as an authorization server, which has access to user identity information. Following successful authentication, a client device may receive access and refresh tokens that can be used to access protected resources, such as applications hosted on application servers.

In order to access the applications, the client devices may be provided a web desktop or other portal, which allows access to on-premises and software-as-a-service ("SaaS") applications via different types of authentication schemes such as Security Assertion Markup Language ("SAML"), Open Authorization ("OAuth"), and NT LAN Manager ("NTLM"), for example. While the authentication schemes vary, the access tokens received from the identity provider device can be used to gain access to each of the applications, thereby facilitating what is commonly referred to as Single Sign-On ("SSO") access control.

However, access tokens have limited lifetimes and can be rendered invalid outside of the context of a particular session or for any number of other reasons. If an access token supplied by a client device is determined by an application to be invalid, an application server hosting the application will send an unauthorized HTTP response status code (e.g., "401"), requiring the client device to re-authenticate and resulting in a sub-optimal experience for the user.

SUMMARY

A method for token refreshment based on single sign-on (SSO) for federated identity environments implemented by a network traffic management system comprising one or more access policy management (APM) apparatuses, identity provider devices, application servers, or client devices, the method including sending a request received from a client to an application server along with an access token. A determination is made when a received response to the request comprises an unauthorized HyperText Transfer Protocol (HTTP) response status code. The access token is refreshed using a stored refresh token, when the determining indicates that the response is an unauthorized HTTP response status code. The request is resent to the application server along with the refreshed access token.

An APM apparatus, comprising memory comprising programmed instructions stored thereon and one or more processors configured to be capable of executing the stored programmed instructions to send a request received from a client to an application server along with an access token. A determination is made when a received response to the request comprises an unauthorized HTTP response status code. The access token is refreshed using a stored refresh token, when the determining indicates that the response is an unauthorized HTTP response status code. The request is resent to the application server along with the refreshed access token.

A non-transitory computer readable medium having stored thereon instructions for token refreshment based on SSO for federated identity environments comprising executable code which when executed by one or more processors, causes the processors to send a request received from a client to an application server along with an access token. A determination is made when a received response to the request comprises an unauthorized HTTP response status code. The access token is refreshed using a stored refresh token, when the determining indicates that the response is an unauthorized HTTP response status code. The request is resent to the application server along with the refreshed access token.

A network traffic management system comprising one or more APM apparatuses, identity provider devices, application servers, or client devices, the network traffic management system comprising memory comprising programmed instructions stored thereon and one or more processors configured to be capable of executing the stored programmed instructions to send a request received from a client to an application server along with an access token. A determination is made when a received response to the request comprises an unauthorized HTTP response status code. The access token is refreshed using a stored refresh token, when the determining indicates that the response is an unauthorized HTTP response status code. The request is resent to the application server along with the refreshed access token.

This technology has a number of associated advantages including providing methods, non-transitory computer readable media, APM apparatuses, and network traffic management systems that facilitate token refreshment on behalf of a client to allow a client to obtain requested application content more quickly when an access token has expired. Accordingly, this technology reduces the number of communications exchanged with a client as a result of an unauthorized HTTP response status code, reduces user re-authentication at client devices upon access token expiration, and significantly improves the user experience.

DETAILED DESCRIPTION

Figure 1:
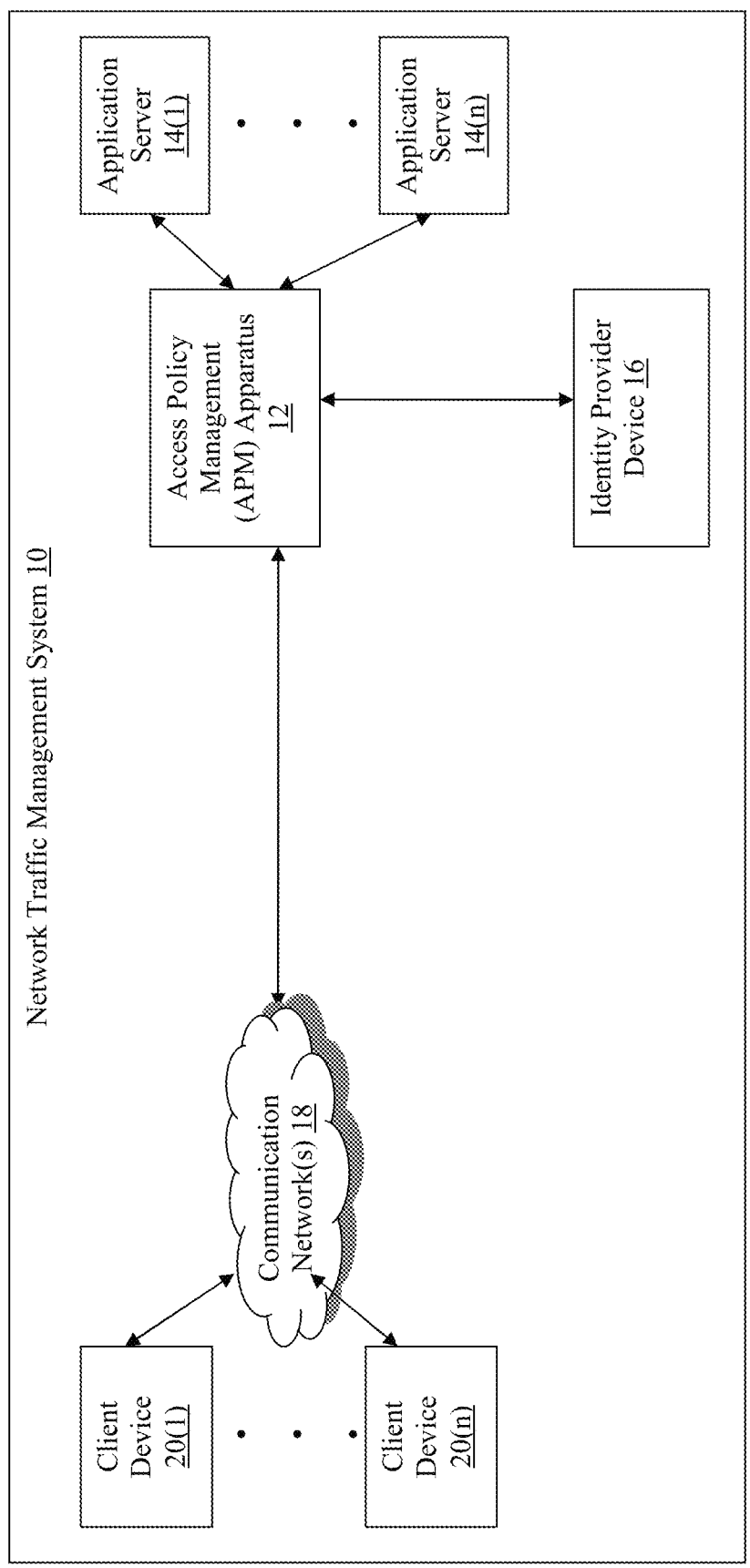
FIG. 1 is a block diagram of an exemplary network traffic management system with an access policy management (APM) apparatus.

Referring to FIG. 1, an exemplary network environment which incorporates an exemplary network traffic management system 10 is illustrated. The network traffic management system 10 in this example includes an access policy management (APM) apparatus 12 that is coupled to application servers 14(1)-14(n), an identity provider device 16, and, via communication network(s) 18, a plurality of client devices 20(1)-20(n), although the APM apparatus 12, application servers 14(1)-14(n), identity provider device 16, and/or client devices 20(1)-20(n) may be coupled together via other topologies. The network traffic management system 10 may include other network devices such as one or more routers and/or switches, for example, which are well known in the art and thus will not be described herein. This technology provides a number of advantages including methods, non-transitory computer readable media, network traffic management systems, and APM apparatuses that facilitate an improved user experience in a federated identity environment by reducing or eliminating the number of unauthorized HTTP response status codes transmitted to client devices.

Figure 2:
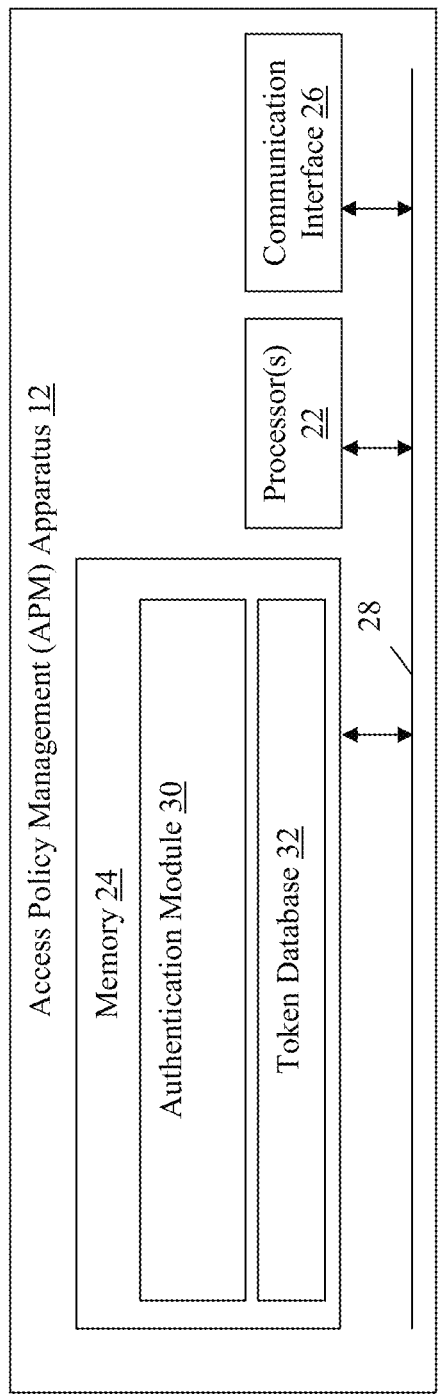
FIG. 2 is a block diagram of an APM apparatus.

Referring to FIGS. 1-2, the APM apparatus 12 may perform any number of functions including managing network traffic, load balancing network traffic across the application servers 14(1)-14(n), facilitating secure access to applications hosted by the application servers 14(1)-14(n), and/or accelerating network traffic exchanged with applications hosted by the application servers 14(1)-14(n), for example. The APM apparatus 12 includes one or more processors 22, a memory 24, and/or a communication interface 26, which are coupled together by a bus 28 or other communication link, although the APM apparatus 12 can include other types and/or numbers of elements in other configurations.

The processor(s) 22 of the APM apparatus 12 may execute programmed instructions stored in the memory 24 of the APM apparatus 12 for any number of the functions identified above and/or described and illustrated in detail herein. The processor(s) 22 of the APM apparatus 12 may include one or more CPUs or general purpose processors with one or more processing cores, for example, although other types of processor(s) can also be used.

The memory 24 of the APM apparatus 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 22, can be used for the memory 24.

Accordingly, the memory 24 of the APM apparatus 12 can store one or more applications that can include computer executable instructions that, when executed by the APM apparatus 12, cause the APM apparatus 12 to perform actions, such as to transmit, receive, or otherwise process messages, for example, and to perform other actions described and illustrated below with reference to FIGS. 3-4. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the APM apparatus 12 itself, may be located in virtual server(s) running in a cloud-based computing environment rather than being tied to one or more specific physical network computing devices. Also, the application(s) may be running in one or more virtual machines (VMs) executing on the APM apparatus 12. Additionally, in one or more embodiments of this technology, virtual machine(s) running on the APM apparatus 12 may be managed or supervised by a hypervisor.

In this particular example, the memory 24 of the APM apparatus 12 includes an authentication module 30 and a token database 32, although the memory 24 can include other policies, modules, databases, or applications, for example. The authentication module 30 is configured to process login requests received from the client devices 20(1)-20(n) and communicate with the identity provider device 16 to obtain and utilize access and refresh tokens for authenticated users. Accordingly, the authentication module can extract credentials from received login requests, obtain authorization grant codes from the identity provider device 16, and obtain refresh and access tokens from the identity provider device 16.

The token database 32 stores at least refresh tokens received from the identity provider device 16 as associated with particular users, ones of the client devices 20(1)-20(n), and/or established sessions, for example. By storing the refresh tokens locally, the APM apparatus 12 can advantageously refresh access tokens utilizing the refresh tokens prior to sending unauthorized HTTP response status codes received from the application servers 14(1)-14(n) to the client devices 20(1)-20(n), as described and illustrated in more detail later.

The communication interface 26 of the APM apparatus 12 operatively couples and communicates between the APM apparatus 12, application servers 14(1)-14(n), identity provider device 16, and/or client devices 20(1)-20(n), which are all coupled together by the communication network(s) 18 or direct connections, although other types and/or numbers of communication networks or systems with other types and/or numbers of connections and/or configurations to other devices and/or elements can also be used.

By way of example only, the communication network(s) 18 can include local area network(s) (LAN(s)) or wide area network(s) (WAN(s)), and can use TCP/IP over Ethernet and industry-standard protocols, although other types and/or numbers of protocols and/or communication networks can be used. The communication network(s) 18 in this example can employ any suitable interface mechanisms and network communication technologies including, for example, tele-traffic in any suitable form (e.g., voice, modem, and the like), Public Switched Telephone Network (PSTNs), Ethernet-based Packet Data Networks (PDNs), combinations thereof, and the like. The communication network(s) 18 can also include direct connection(s) (e.g., for when a device illustrated in FIG. 1, such as the APM apparatus 12, one or more of the client devices 20(1)-20(n), one or more of the application servers 14(1)-14(n), or the identity provider device 16 operate as virtual instances on the same physical machine).

While the APM apparatus 12 is illustrated in this example as including a single device, the APM apparatus 12 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory 24, communication interface 26, or other hardware or software components of one or more other devices included in the APM apparatus 12.

Additionally, one or more of the devices that together comprise the APM apparatus 12 in other examples can be standalone devices or integrated with one or more other devices or apparatuses, such as one of the application servers 14(1)-14(n), for example. Moreover, one or more of the devices of the APM apparatus 12 in these examples can be in a same or a different communication network including one or more public, private, or cloud networks, for example.

The identity provider device 16 in this example includes one or more processors, a memory, and a communication interface, which are coupled together by a bus or other communication link, although other numbers and/or types of network devices could be used. The identity provider device 16 is an authoritative source for identity information for users of the client devices and is configured to provide authentication, authorization, and accounting ("AAA") services on behalf of the network traffic management system 10. Accordingly, the identity provider device 16 provides authorization grant codes and refresh and access tokens to the client devices 20(1)-20(n) to facilitate Single Sign-On ("SSO") in the network traffic management system 10. The identity provider device 16 can also facilitate validation of access tokens for the application servers 14(1)-14(n).

Each of the application servers 14(1)-14(n) in this example includes one or more processors, a memory, and a communication interface, which are coupled together by a bus or other communication link, although other numbers and/or types of network devices could be used. The application servers 14(1)-14(n) in this example process requests received from the client devices 20(1)-20(n) via the communication network(s) 18 according to the HTTP-based application RFC protocol, for example. The requests received from the client devices 20(1)-20(n) are directed to hosted applications and can include access tokens that can be validated by the application servers 14(1)-14(n) utilizing the identity provider device 16. Various applications may be operating on the application servers 14(1)-14(n) and transmitting data (e.g., files or Web pages) to the client devices 20(1)-20(n) in response to requests from the client devices 20(1)-20(n). The application servers 14(1)-14(n) may be hardware or software or may represent a system with multiple servers in a pool, which may include internal or external networks.

Although the application servers 14(1)-14(n) are illustrated as single devices, one or more actions of the application servers 14(1)-14(n) may be distributed across one or more distinct network computing devices that together comprise one or more the application servers 14(1)-14(n). Moreover, the application servers 14(1)-14(n) are not limited to a particular configuration. Thus, the application servers 14(1)-14(n) may contain a plurality of network computing devices that operate using a master/slave approach, whereby one of the network computing devices of one or more of the application servers 14(1)-14(n) operate to manage and/or otherwise coordinate operations of the other network computing devices. The application servers 14(1)-14(n) may operate as a plurality of network computing devices within a cluster architecture, a peer-to peer architecture, virtual machines, or within a cloud architecture, for example.

The client devices 20(1)-20(n) in this example include any type of computing device that can request and receive content, such as mobile computing devices, desktop computing devices, laptop computing devices, tablet computing devices, virtual machines (including cloud-based computers), or the like. Each of the client devices 20(1)-20(n) in this example includes a processor, a memory, and a communication interface, which are coupled together by a bus or other communication link, although other numbers and/or types of network devices could be used.

The client devices 20(1)-20(n) may run interface applications, such as standard web browsers or standalone client applications, which may provide an interface to make requests for, and receive content stored on, the application servers 14(1)-14(n) via the communication network(s) 18. The client devices 20(1)-20(n) may further include a display device, such as a display screen or touchscreen, and/or an input device, such as a keyboard for example.

Although the exemplary network traffic management system 10 with the APM apparatus 12, application servers 14(1)-14(n), identity provider device 16, and client devices 20(1)-20(n) is described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network traffic management system 10, such as the APM apparatus 12, application servers 14(1)-144(n), identity provider device 16, or client devices 20(1)-20(n), for example, may be configured to operate as virtual instances on the same physical machine. In other words, one or more of the APM apparatus 12, application servers 14(1)-14(n), identity provider device 16, or client devices 20(1)-20(n) may operate on the same physical device rather than as separate devices communicating through communication network(s) or other types of connections. Additionally, there may be more or fewer APM apparatuses 12, application servers 14(1)-14(n), identity provider devices 16, or client devices 20(1)-20(n) than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media, which are part of the memory 24 and have instructions stored thereon for one or more aspects of the present technology, as described and illustrated by way of the examples herein. The instructions in some examples include executable code that, when executed by one or more processors (e.g., processor(s) 22), cause the processors to carry out steps necessary to implement the methods of the examples of this technology that are described and illustrated herein.

Figure 3:
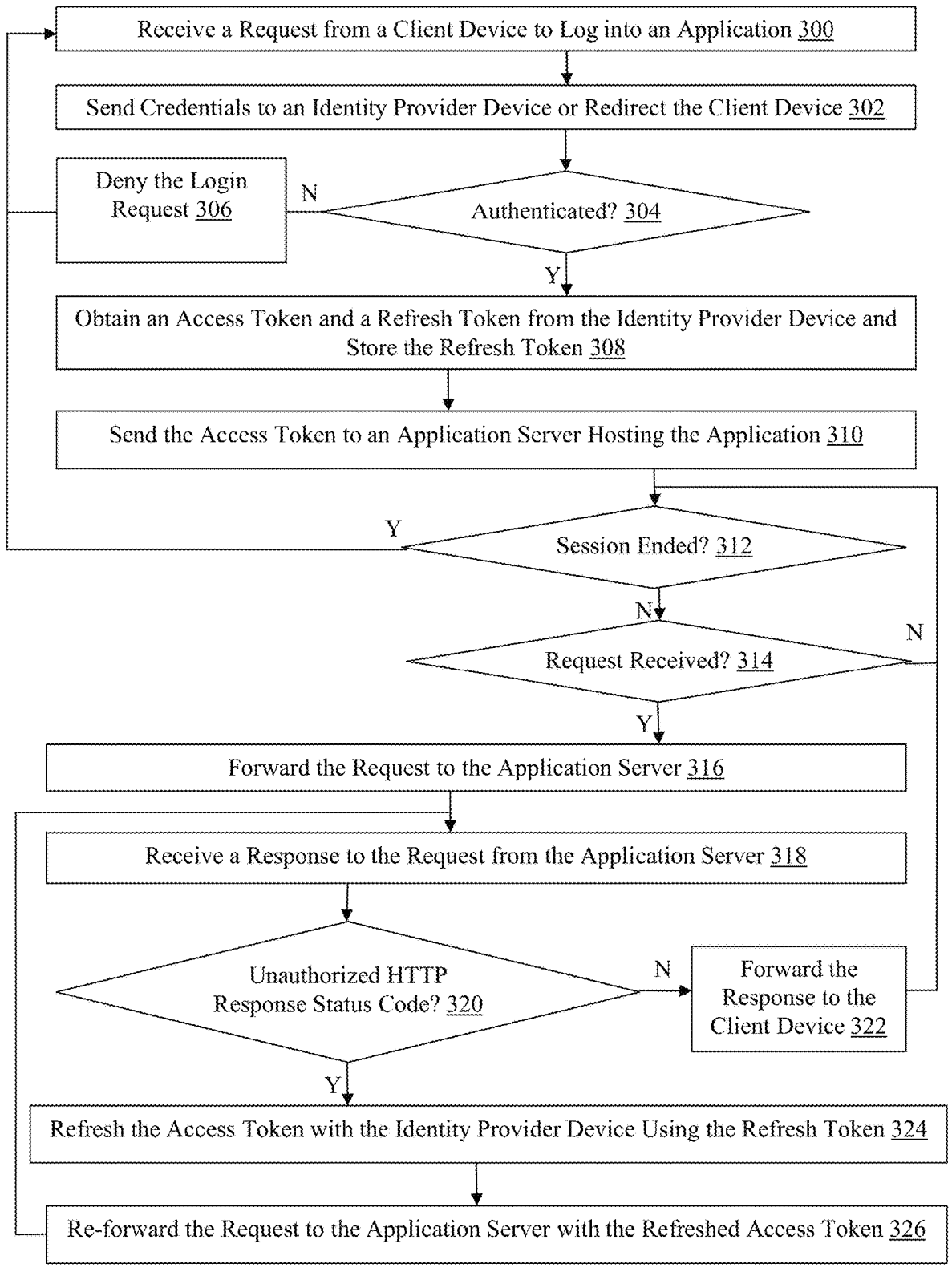
FIG. 3 is a flowchart of an exemplary method for token refreshment based on single sign-on (SSO) for federated identity environments.

Referring more specifically to FIG. 3, a flowchart of an exemplary method for token refreshment based on SSO for federated identity environments is illustrated. In step 300 in this example, the APM apparatus 12 intercepts a request from one of the client devices 20(1)-20(n) to log into an application hosted by one of the application servers 14(1)-14(n). The login request can be directed to the one of the application servers 14(1)-14(n) and can include credentials (e.g., user name and password) for a user of the one of the client devices 14(1)-14(n).

In step 302, the APM apparatus 12 collects credentials from the user (e.g., as included in the login request) and sends the credentials to the identity provider device 16 as part of an authentication request. In another example, the APM apparatus 12 redirects the user to the identity provider device 16, which collects the credentials from the user and authenticates the user. The identity provider device 16 stores the identity and other information for allowed users, which can be compared to the credentials to generate an authentication result that can facilitate SSO access to any number of applications hosted by the application servers 14(1)-14(n). In one particular example, the credentials can be sent by the identity provider device 16 to a backend Active Directory ("AD") or Lightweight Directory Access Protocol ("LDAP") server, although other methods of authenticating the user can be used in other examples.

In step 304, the APM apparatus 12 determines whether the user of the one of the client devices 20(1)-20(n) from which the login request was received in step 300 is authenticated. The determination in step 304 can be made based on a positive or negative authentication result received from the identity provider device 16. In one example, the identity provider device 16 can respond to the credentials with a positive authentication result including an authorization grant code, although other types of authentication results and/or methods of determining whether the user was authenticated can also be used. If the APM apparatus 12 receives a negative authorization result or otherwise determines that the user of the one of the client devices 20(1)-20(n) was not authenticated, then the No branch is taken to step 306.

In step 306, the APM apparatus 12 denies the login request, such as by dropping the login request or sending a response to the one of the client devices 20(1)-20(n) indicating the failure to authenticate and requesting re-submission of credentials, for example, although other methods for denying the login request can also be used. However, if the APM apparatus 12 determines that the user of the one of the client devices 20(1)-20(n) was authenticated, then the Yes branch is taken to step 308.

In step 308, the APM apparatus 12 obtains an access token and a refresh token from the identity provider device 16. In one example, the APM apparatus 12 can send an authorization grant code, received in response to the credentials and with a positive authentication result, to the identity provider device 16 with a request for the tokens, although other methods for obtaining the tokens can also be used in other examples. The access token in this example has a shorter lifetime than the refresh token and can be validated by the application servers 14(1)-14(n) in order to authenticate users and service client requests.

The refresh token has a longer lifetime than the access token and can be used to obtain a new or renewed access token, referred to herein as a refreshed access token, as described and illustrated in more detail later. In this example, the APM apparatus 12 stores at least the refresh token, and optionally the access token and/or user credentials, in the token database 32 so that the refresh token can be used as described and illustrated in more detail later with reference to step 324.

In step 310, the APM apparatus 12 sends the login request along with the access token to one of the application servers 14(1)-14(n) hosting the application to which the login request received in step 300 was directed. Optionally, the one of the application servers 14(1)-14(n) can communicate with the identity provider device 16 to validate the access token and thereby authenticate the user of the one of the client devices 20(1)-20(n). The one of the application servers 14(1)-14(n) can respond, subsequent to validating the token, with an acceptance of the login request. The APM apparatus 12 can communicate the acceptance to the one of the client devices 20(1)-20(n) and establish a session between the one of the client devices 20(1)-20(n) and the one of the application servers 14(1)-14(n) to facilitate communication with the application.

In step 312, the APM apparatus 12 determines whether the established session has ended, such as based on a timeout or explicit logout, for example. If the APM apparatus 12 determines that the session has ended, then the Yes branch is taken back to step 300 and the APM apparatus 12 may again receive a login request from the one of the client devices 20(1)-20(n) or a different one of the client devices 20(1)-20(n). Optionally, the APM apparatus 12 also may perform other operations, such as clearing any entries of the token database 32 associated with the session by removing the stored refresh token, for example. However, in at least a first iteration, the session will not have ended and the No branch will be taken from step 312 to step 314.

In step 314, the APM apparatus 12 determines whether a request has been received from the one of the client devices 20(1)-20(n) via the established session. If the APM apparatus 12 determines that a request has not been received from the one of the client devices 20(1)-20(n), then the No branch is taken back to step 312 and the APM apparatus 12 effectively waits for the session to end or a request to be received from the one of the client devices 20(1)-20(n). Accordingly, if the APM apparatus 12 determines that a request directed to the application was received from the one of the client devices 20(1)-20(n), then the Yes branch is taken to step 316.

In step 316, the APM apparatus 12 forwards the request to the one of the application servers 14(1)-14(n) with which the session was established in step 310. The access token is sent to the one of the application servers 14(1)-14(n) along with the request as retrieved from the memory 24 or as included with the request received from the one of the client devices 20(1)-20(n), for example.

In step 318, the APM apparatus 12 receives a response to the request from the one of the application servers 14(1)-14(n). The one of the application servers 14(1)-14(n) can validate the use of the one of the client devices 20(1)-20(n) with the identity provider device 16 using the access token. The response can be received via the session established in step 310 and can include content, such as a web page or media associated with the application.

In step 320, the APM apparatus 12 determines whether the response is an unauthorized HTTP response status code, such as a 401 response status code. If the one of the application servers 14(1)-14(n) determines that the request sent in step 316 is not from an authorized user, then the response from the one of the application servers 14(1)-14(n) can be an unauthorized HTTP response status code. The user may not be authorized because the access token sent with the request in step 316 may have expired, has been revoked, or otherwise no longer be valid, for example. If the APM apparatus 12 determines that the response from the one of the application servers is not an unauthorized HTTP response status code, then the No branch is taken to step 322.

In step 322, the APM apparatus 12 forwards the response to the one of the client devices 20(1)-20(n) and proceeds back to step 312. However, if the APM apparatus 12 determines in step 320 that the response from the one of the application severs 14(1)-14(n) is an unauthorized HTTP response status code, then the Yes branch is taken to step 324.

In step 324, the APM apparatus 12 refreshes the access token with the identity provider device 16 using the refresh token received and stored in the token database 32 in step 308. In one example, the APM apparatus 12 obtains a new or renewed token (referred to herein as a refreshed access token) by sending a request to the identity provider device 16 that includes the refresh token, although other methods for refreshing the access token can also be used. In this example, the identity provider device 16 validates the refresh token and issues the refreshed access token to the APM apparatus 12 in response.

In step 326, the APM apparatus 12 re-forwards the request to the one of the application servers 14(1)-14(n) along with the refreshed access token. In another example in which the refresh token is expired or has been revoked, the identity provider device 16 may deny the request from the APM apparatus 12 for a refreshed access token. Accordingly, in this example, the APM apparatus 12 may not be able to refresh the access token in step 324 and may proceed to forward the unauthorized HTTP response status code to the one of the client devices 20(1)-20(n), requiring re-authentication by the user, instead of re-forwarding the request to the one of the application servers 14(1)-14(n) in step 326.

However, in examples in which the refresh token is valid, instead of forwarding the unauthorized HTTP response status code to the one of the client devices 20(1)-20(n), the APM apparatus refreshes the access token in this example and re-forwards the request received from the one of the client devices 20(1)-20(n) to the one of the application servers 14(1)-14(n) along with the refreshed access token, resulting in an improved experience for the user of the one of the client devices 20(1)-20(n). In particular, the user of the one of the client devices 20(1)-20(n) advantageously does not have to re-authenticate or resubmit credentials and does not have to experience an associated delay in obtaining the requested application content.

Subsequent to re-forwarding the request to the one of the application servers 14(1)-14(n), the APM apparatus 12 proceeds back to step 318 and again receives a response to the request from the one of the application servers 14(1)-14(n). In this iteration, the one of the application servers 14(1)-14(n) will validate the refreshed access token and the response received in step 318 will include the requested application content instead of an unauthorized HTTP response status code. Accordingly, in this subsequent iteration, the No branch will be taken from step 320, the response will be forwarded by the APM apparatus 12 in step 322, and the APM apparatus 12 will proceed back to step 312 and again wait for the session to end or for another request to be received from the one of the client devices 20(1)-20(n).

Figure 4:
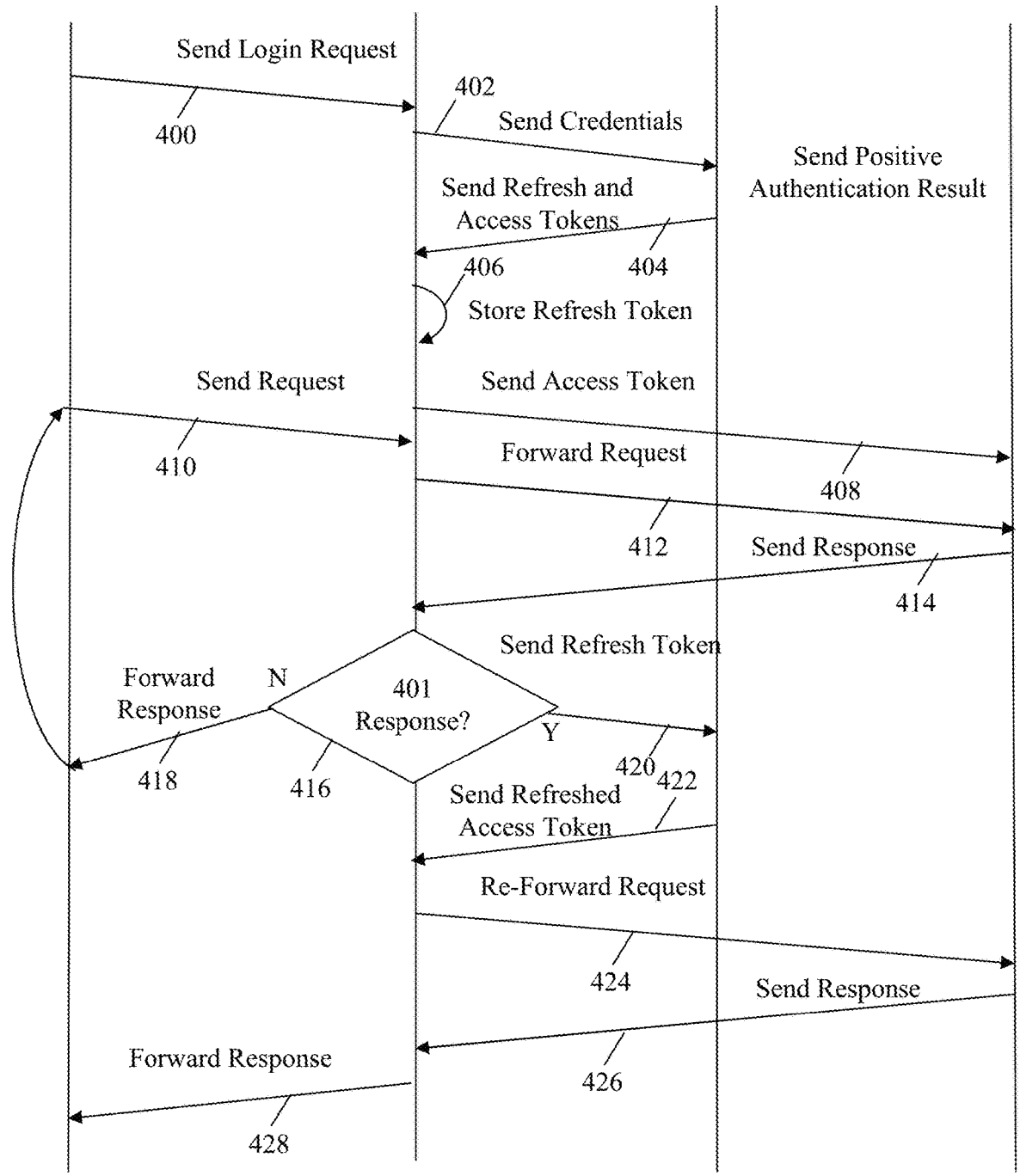
FIG. 4 is a timing diagram of an exemplary method for token refreshment based on SSO for federated identity environments.

Referring more specifically to FIG. 4, a timing diagram of an exemplary method for token refreshment based on SSO for federated identity environments is illustrated. In step 400 in this example, the client device 20 sends a login request toward an application hosted by the application server 14, which is intercepted by the APM apparatus 12.

In step 402, the APM apparatus 12 sends credentials included in the received login request to the identity provider device 16. In another example, the APM apparatus 12 could redirect the client device 12 to the identity provider device 16 to allow the identity provider device 16 to collect the credentials.

In step 404 in this example, the identity provider device 16 authenticates the user and sends the refresh and access tokens to the APM apparatus 12 in response to the request. Optionally, the identity provider device 16 first sends an authorization grant code to the APM apparatus 12, which is used by the APM apparatus 12 to request and obtain the refresh and access tokens from the identity provider device 16.

In step 406, the APM apparatus 12 stores the refresh token so that it can subsequently be retrieved and used to refresh the access token with the identity provider device 16. The APM apparatus 12 also stores the access token in this example. The tokens can optionally be stored in a local token database 32, for example.

In step 408, the APM apparatus 12 sends the access token along with the login request to the application server 14 hosting an application to which the login request sent in step 400 was directed. The APM apparatus 12 communicates acceptance of the login request by the application server 14 to the client device 20 and establishes a session between the client device 20 and the application server 14 to facilitate communication with the application.

In step 410, the client device sends a request toward the application hosted by the application server 14, which is intercepted by the APM apparatus 12. The request can be sent via the established session, for example.

In step 412, the APM apparatus 12 forwards the request to the application server 14. This request is forwarded with the access token and via the established session in this example.

In step 414, the application server 14 sends a response to the request to the APM apparatus 12. In this example, the application server 14 attempts to validate the access token sent with the forwarded request in step 412. If the application server 14 successfully validates the access token, then the requested content will be included in the response sent in step 414. However, if the application server 12 cannot successfully validate the access token (e.g., if it is expired or has been revoked), then the response sent in step 414 will be an unauthorized HTTP response status code.

Accordingly, in step 416, the APM apparatus 12 determines whether the response sent from the application server 14 is an unauthorized HTTP response status code (e.g., a 401 response). If the APM apparatus 12 determines that the response is not an unauthorized HTTP response status code, then the No branch is taken and the response is forwarded to the client device 20 in step 418.

However, if the APM apparatus 12 determines in step 416 that the response is an unauthorized HTTP response status code, then the Yes branch is taken and the refresh token is used in step 420 to obtain a refreshed access token from the identity provider device 16. The refresh token is retrieved from a token database 32, for example, wherein it was stored in step 406.

In step 422, the identity provider device 16 determines whether the refresh token is valid and sends a refreshed access token to the APM apparatus 12 when the refresh token is determined to be valid. If the refresh token is not determined to be valid, then the identity provider apparatus 16 may send a denial of the request for a refreshed access token in another example.

In step 424, the APM apparatus 12 re-forwards the request sent by the client device 20 in step 410 along with the refreshed access token. Accordingly, the APM apparatus 12 in this example is able to resend the request with a valid, refreshed access token without requiring any communication with the client device 20.

In step 426, the application server 14 sends a response to the APM apparatus 12 upon validating the refreshed access token. The response sent in step 426 includes the content requested by the client device 20.

The APM apparatus 12 then forwards the response to the client device 20 in step 428 in response to the request sent by the client device 20 in step 410. In this example, the client device 20 advantageously receives the content without processing an unauthorized HTTP response status code or performing any re-authentication despite initially sending the request for the content in step 410 with an invalid access token.

With this technology, the user experience in an SSO federated identity environment can be significantly improved. In particular, an intermediary APM apparatus can refresh access tokens automatically and without sending any unauthorized HTTP response status codes received from application servers to client devices, or requiring user re-authorization at the client devices. This technology advantageously allows users to obtain requested application content more quickly when an access token has expired, been revoked, or is otherwise invalidated.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for authentication in federated identity environments implemented by a network traffic management system comprising one or more access management apparatuses, identity provider devices, server devices, or client devices, the method comprising:

sending an application request received from a client to an application server along with an access token, wherein the access token is obtained from an identity provider device based on user credentials provided to the identity provider device;

determining when a received response to the application request with the access token comprises an unauthorized HyperText Transfer Protocol (HTTP) response status code;

refreshing the access token using a stored refresh token obtained from the identity provider, when the determination indicates that the response to the application request comprises an unauthorized HTTP response status code; and resending the application request to the application server along with the refreshed access token to facilitate access for the client to a resource hosted by the application server.

2. The method of claim 1, wherein the access token is refreshed without forwarding the unauthorized HTTP response status code to the client.

3. The method of claim 1, further comprising:

sending the user credentials extracted from a login request received from the client to the identity provider device; and receiving the access token and the refresh token from the identity provider device; and storing at least the refresh token.

4. The method of claim 1, further comprising forwarding the response to the client, when the determination indicates that the response is not an unauthorized HTTP response status code.

5. The method of claim 1, further comprising:

redirecting the client to the identity provider device following receipt of a login request from the client to facilitate authentication of the user credentials by the identity provider device;

receiving the access token and the refresh token from the client; and storing at least the refresh token.

6. An access management apparatus, comprising memory comprising programmed instructions stored thereon and one or more processors configured to be capable of executing the stored programmed instructions to:

send an application request received from a client to an application server along with an access token, wherein the access token is obtained from an identity provider device based on user credentials provided to the identity provider device;

determine when a received response to the application request with the access token comprises an unauthorized HyperText Transfer Protocol (HTTP) response status code;

refresh the access token using a stored refresh token obtained from the identity provider, when the determination indicates that the response to the application request comprises an unauthorized HTTP response status code; and resend the application request to the application server along with the refreshed access token to facilitate access for the client to a resource hosted by the application server.

7. The access management apparatus of claim 6, wherein the access token is refreshed without forwarding the unauthorized HTTP response status code to the client.

8. The access management apparatus of claim 6, wherein the one or more processors are further configured to be capable of executing the stored programmed instructions to:

send the user credentials extracted from a login request received from the client to the identity provider device; and receive the access token and the refresh token from the identity provider device; and store at least the refresh token.

9. The access management apparatus of claim 6, wherein the one or more processors are further configured to be capable of executing the stored programmed instructions to forward the response to the client, when the determination indicates that the response is not an unauthorized HTTP response status code.

10. The access management apparatus of claim 6, wherein the one or more processors are further configured to be capable of executing the stored programmed instructions to:

redirect the client to the identity provider device following receipt of a login request from the client to facilitate authentication of the user credentials by the identity provider device;

receive the access token and the refresh token from the client; and store at least the refresh token.

11. A non-transitory computer readable medium having stored thereon instructions for authentication in federated identity environments comprising executable code which when executed by one or more processors, causes the one or more processors to:

send an application request received from a client to an application server along with an access token, wherein the access token is obtained from an identity provider device based on user credentials provided to the identity provider device;

determine when a received response to the application request with the access token comprises an unauthorized HyperText Transfer Protocol (HTTP) response status code;

refresh the access token using a stored refresh token obtained from the identity provider, when the determination indicates that the response to the application request comprises an unauthorized HTTP response status code; and resend the application request to the application server along with the refreshed access token to facilitate access for the client to a resource hosted by the application server.

12. The non-transitory computer readable medium of claim 11, wherein the access token is refreshed without forwarding the unauthorized HTTP response status code to the client.

13. The non-transitory computer readable medium of claim 11, wherein the executable code when executed by the one or more processors further causes the one or more processors to:

send the user credentials extracted from a login request received from the client to the identity provider device; and receive the access token and the refresh token from the identity provider device; and store at least the refresh token.

14. The non-transitory computer readable medium of claim 11, wherein the executable code when executed by the one or more processors further causes the one or more processors to forward the response to the client, when the determination indicates that the response is not an unauthorized HTTP response status code.

15. The non-transitory computer readable medium of claim 11, wherein the executable code when executed by the one or more processors further causes the one or more processors to:

redirect the client to the identity provider device following receipt of a login request from the client to facilitate authentication of the user credentials by the identity provider device;

receive the access token and the refresh token from the client; and store at least the refresh token.

16. A network traffic management system, comprising one or more access management apparatuses, identity provider devices, server devices, or client devices with memory comprising programmed instructions stored thereon and one or more processors configured to be capable of executing the stored programmed instructions to:

send an application request received from a client to an application server along with an access token, wherein the access token is obtained from an identity provider device based on user credentials provided to the identity provider device;

determine when a received response to the application request with the access token comprises an unauthorized HyperText Transfer Protocol (HTTP) response status code;

refresh the access token using a stored refresh token obtained from the identity provider, when the determination indicates that the response to the application request comprises an unauthorized HTTP response status code; and resend the application request to the application server along with the refreshed access token to facilitate access for the client to a resource hosted by the application server.

17. The network traffic management system of claim 16, wherein the access token is refreshed without forwarding the unauthorized HTTP response status code to the client.

18. The network traffic management system of claim 16, wherein the one or more processors are further configured to be capable of executing the stored programmed instructions to:

send the user credentials extracted from a login request received from the client to the identity provider device; and receive the access token and the refresh token from the identity provider device; and store at least the refresh token.

19. The network traffic management system of claim 16, wherein the one or more processors are further configured to be capable of executing the stored programmed instructions to forward the response to the client, when the determination indicates that the response is not an unauthorized HTTP response status code.

20. The network traffic management system of claim 16, wherein the one or more processors are further configured to be capable of executing the stored programmed instructions to:

redirect the client to the identity provider device following receipt of a login request from the client to facilitate authentication of the user credentials by the identity provider device;

receive the access token and the refresh token from the client; and store at least the refresh token.

* * * * *